US012327912B2

(12) United States Patent
Bekaert

(10) Patent No.: US 12,327,912 B2
(45) Date of Patent: Jun. 10, 2025

(54) VEHICLE ANTENNA MODULE

(71) Applicant: Continental Automotive Technologies GmbH, Hannover (DE)

(72) Inventor: Jean-Philippe Bekaert, Montigny le Bretonneux (FR)

(73) Assignee: CONTINENTAL AUTOMOTIVE TECHNOLOGIES GMBH, Hannover (DE)

( * ) Notice: Subject to any disclaimer, the term of this patent is extended or adjusted under 35 U.S.C. 154(b) by 0 days.

(21) Appl. No.: 18/836,783

(22) PCT Filed: Mar. 1, 2023

(86) PCT No.: PCT/EP2023/055103
§ 371 (c)(1),
(2) Date: Aug. 8, 2024

(87) PCT Pub. No.: WO2023/169891
PCT Pub. Date: Sep. 14, 2023

(65) Prior Publication Data

US 2025/0149780 A1 May 8, 2025

(30) Foreign Application Priority Data

Mar. 7, 2022 (FR) ...................................... 2201959

(51) Int. Cl.
*H01Q 1/32* (2006.01)
*H01Q 1/42* (2006.01)

(52) U.S. Cl.
CPC ............ *H01Q 1/3275* (2013.01); *H01Q 1/42* (2013.01)

(58) Field of Classification Search
CPC ............................... H01Q 1/3275; H01Q 1/42
See application file for complete search history.

(56) References Cited

U.S. PATENT DOCUMENTS

2021/0050655 A1* 2/2021 Miura ..................... H01Q 1/42

FOREIGN PATENT DOCUMENTS

| | | | |
|---|---|---|---|
| EP | 3761446 | A1 | 1/2021 |
| FR | 3092440 | A3 | 8/2020 |
| WO | 2017178384 | A1 | 10/2017 |

OTHER PUBLICATIONS

French Search Report with translation mailed Oct. 20, 2022, by the French Patent Office for corresponding Application No. FR2201959. (14 pages).

(Continued)

*Primary Examiner* — David E Lotter
(74) *Attorney, Agent, or Firm* — Buchanan Ingersoll & Rooney PC

(57) ABSTRACT

A vehicle antenna module including a first main printed circuit board seated horizontally in a housing, at least one second printed circuit board including a radio frequency antenna mounted vertically on the first printed circuit board and projecting from an upper face of the housing, a cover mounted on the housing and designed to cover at least the second printed circuit board. The antenna module being such that the cover includes a shell and an elastic element. The elastic element being designed to exert a pressure on the upper edge of the second board when the cover is in place on the housing in order to provide an electrical contact between the lower edge of the second board and at least one flexible contact element on the surface of the first board.

11 Claims, 4 Drawing Sheets

(56) References Cited

OTHER PUBLICATIONS

International Search Report (PCT/ISA/210) and Written Opinion (PCT/ISA/237) with full translation mailed Jun. 1, 2023, by the European Patent Office as the International Searching Authority for International Application No. PCT/EP2023/055103. (18 pages).

* cited by examiner

VEHICLE ANTENNA MODULE

CROSS REFERENCE TO RELATED APPLICATIONS

This application is the U.S. National Phase Application of PCT International Application No. PCT/EP2023/055103, filed Mar. 1, 2023, which claims priority to French Application No. 2201959, Mar. 7, 2022, the contents of such applications being incorporated by reference herein.

FIELD OF THE INVENTION

The present invention relates to the domain of antennas for road vehicles, and more specifically to a vertical antenna module built into a roof spoiler of a vehicle.

BACKGROUND OF THE INVENTION

Nowadays, it is increasingly common for road vehicles to be fitted with compact roof antennas designed to enable data to be exchanged between the vehicle and Wi-Fi or cellular communication networks, radio programs to be received, or signals transmitted by GNSS (global navigation satellite system) geolocation satellites to be received. These antennas are usually referred to as smart antennas, since they comprise signal processing circuits in addition to the antennas themselves.

Motor vehicle antennas of this type are conventionally seated in an antenna housing located on the roof of the vehicle and protected by a cover, for example a fin-shaped cover, mounted on a base. The antenna module comprises a first horizontal printed circuit, on which is vertically placed at least one second printed circuit comprising one or more specific antenna patterns. The second printed circuit forms the antenna itself, which may be electrically connected to a face of the first circuit by means of a connector fastened to the first board, forming a clamp into which the second board is inserted. Such a connection method between the first and second circuits is however cumbersome and costly.

Alternatively, the second circuit may be connected to the first circuit by welding. However, this is a difficult operation that complicates the assembly step and poses reliability issues over time, notably as a result of vibration and/or deformation caused by temperature changes, which may weaken the welds.

There is therefore a need for an antenna module that does not have the aforementioned drawbacks.

SUMMARY OF THE INVENTION

For this purpose, a vehicle antenna module is proposed, comprising:

- a first main printed circuit board seated horizontally in a housing,
- at least one second printed circuit board comprising a radio frequency antenna mounted vertically on the first printed circuit board and projecting from an upper face of the housing,
- a cover mounted on said housing and designed to cover at least the second printed circuit board.

The antenna module is noteworthy in that the cover comprises a shell and an elastic element, the elastic element being designed to exert a pressure on the upper edge of the second board when the cover is in place on the housing in order to provide an electrical contact between the lower edge of the second board and at least one flexible contact element on the surface of the first board.

This provides an assembly between the first board and the second board that is robust and easy to implement, and that provides a safe electrical contact between the two perpendicular boards, which can withstand vibrations, changes in temperature, and relaxation of the plastic parts caused by aging thereof.

The flexible contact element with which the lower edge of the second card comes into contact makes it possible to absorb the relative displacements and clearances of one card with respect to the other, thus ensuring permanent contact.

The elastic element placed between the cover and the upper edge of the second board exerts a vertical pressure on the second board, thereby pressing the lower edge of the second board against the flexible contact elements arranged on the surface of the first board.

This facilitates assembly of the antenna module and obviates the need for a welding step, while guaranteeing good electrical continuity between the first and second boards. This provides a robust and reliable antenna module that is easy to assemble.

According to a specific embodiment, the elastic element is designed to exert a pressure on the upper edge of the second board by means of at least one interference pusher.

The element thus exerts a specific force on one or more points of the upper edge of the antenna. The applied force is thus controlled, unlike with a continuous contact over the length of the upper edge of the antenna, where irregularities in the cutting of the antenna and/or in the molding of the elastic element would make the exerted compression force and the distribution thereof on the antenna uncertain.

According to a specific embodiment, the at least one flexible contact element is a spring-loaded pin.

Using spring-loaded pins provides contact between the first and second boards at a lower cost.

According to a specific embodiment, the at least one flexible contact element is made of a conductive elastomer.

Such an arrangement improves the reliability of the contacts by preventing oxidation and improves mechanical tolerance absorption. A flexible contact made of conductive elastomer further provides greater resistance against the risk of tearing and/or deformation during handling, unlike metal Z-spring or clamp contacts.

In a specific embodiment, the second board comprises at least one shoulder forming a stop bearing against the housing to limit the compression of the at least one flexible contact element by the lower edge of the second board.

The shoulder butting against the housing limits the vertical travel of the antenna. This controls the compression of the flexible contact points. This prevents excessive compression of the flexible contacts from permanently deforming the contact points and adversely affecting electrical continuity. Such an arrangement improves the reliability of the antenna module.

According to a specific embodiment, the elastic element is made by overmolding an internal part of the shell with a thermoplastic elastomer.

Overmolding improves the positioning precision of the flexible element. Furthermore, it may be done automatically, unlike an attached part, and in particular handled by a robot given the required flexibility. This improves the quality and production cost of the antenna module.

In a specific embodiment, the elastic element comprises at least one pair of lateral ribs designed to receive the upper edge of the second board and to limit the lateral displacements thereof.

The upper part of the antenna is thus held laterally. The occurrence of vibration liable to cause noise and to adversely affect contact between the vertical board and the main board is thus prevented. Unlike other techniques in which the upper part of the board is held by formations provided for this purpose on the inside of the cover, such as a slot, the printed circuit board comprising the antenna can be inserted between flexible ribs using a controlled mechanical force, thereby facilitating assembly and causing no stress to the printed circuit.

In a specific embodiment, the elastic element has a Shore A hardness of between 45 and 55, preferably Shore A 50.

Such a hardness value limits the assembly force required to position the cover, while providing satisfactory vibration absorption. The elastomer is also formulated to provide a low dielectric loss tangent so as not to disturb operation of the vertical antennas covered by the cover.

According to another aspect, the invention relates to a vehicle comprising an antenna module as described above.

Such a vehicle provides at least advantages similar to those provided by the antenna module described above.

BRIEF DESCRIPTION OF THE DRAWINGS

Other aspects, aims and advantages of the invention will become apparent on reading the following description of one of its embodiments, which embodiment is given by way of nonlimiting example. Aspects of the invention will also be better understood in light of the appended drawings, in which.

DETAILED DESCRIPTION OF EXEMPLARY EMBODIMENTS

The description below contains numerous specific details to enable a person skilled in the art to better understand an aspect of the present invention. However, it is obvious that the implementation of the present invention need not include all of these specific details. Furthermore, an aspect of the present invention is not limited to the specific embodiments described. On the contrary, an aspect of the present invention may be implemented with any combination of the features and elements set out below, whether or not they relate to different embodiments. Consequently, the aspects, features, embodiments and advantages described below are described for illustrative purposes only and should not be considered to be elements or limitations of the claims unless they are explicitly mentioned in the claims.

Figure 1:
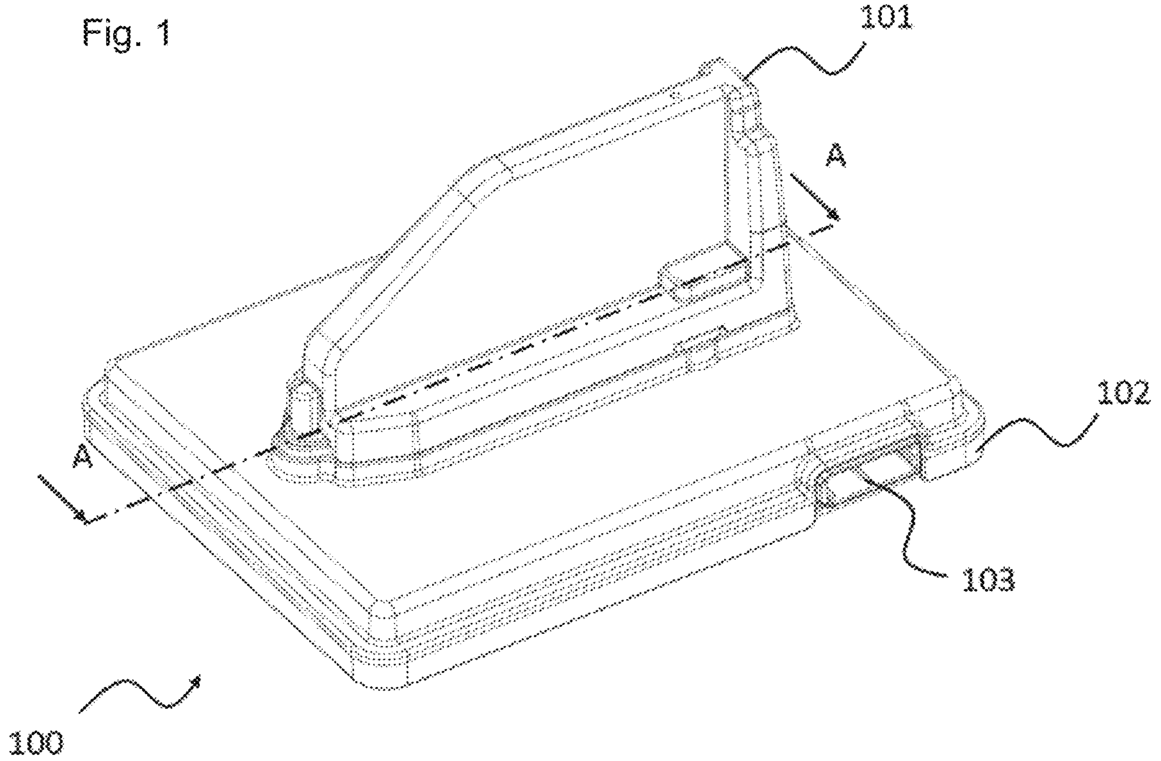
FIG. 1 is a perspective view of an antenna module according to a specific embodiment.

FIG. 1 is a perspective view of an antenna module 100 according to a specific embodiment. The antenna module 100 is intended to be built into the roof of a vehicle and comprises a housing 102 onto which is fastened a cover 101. The housing 102 comprises at least one connector 103 that is intended to connect an electronic board inside the housing 102 to at least one device of the vehicle into which the antenna module is built.

Figure 2:
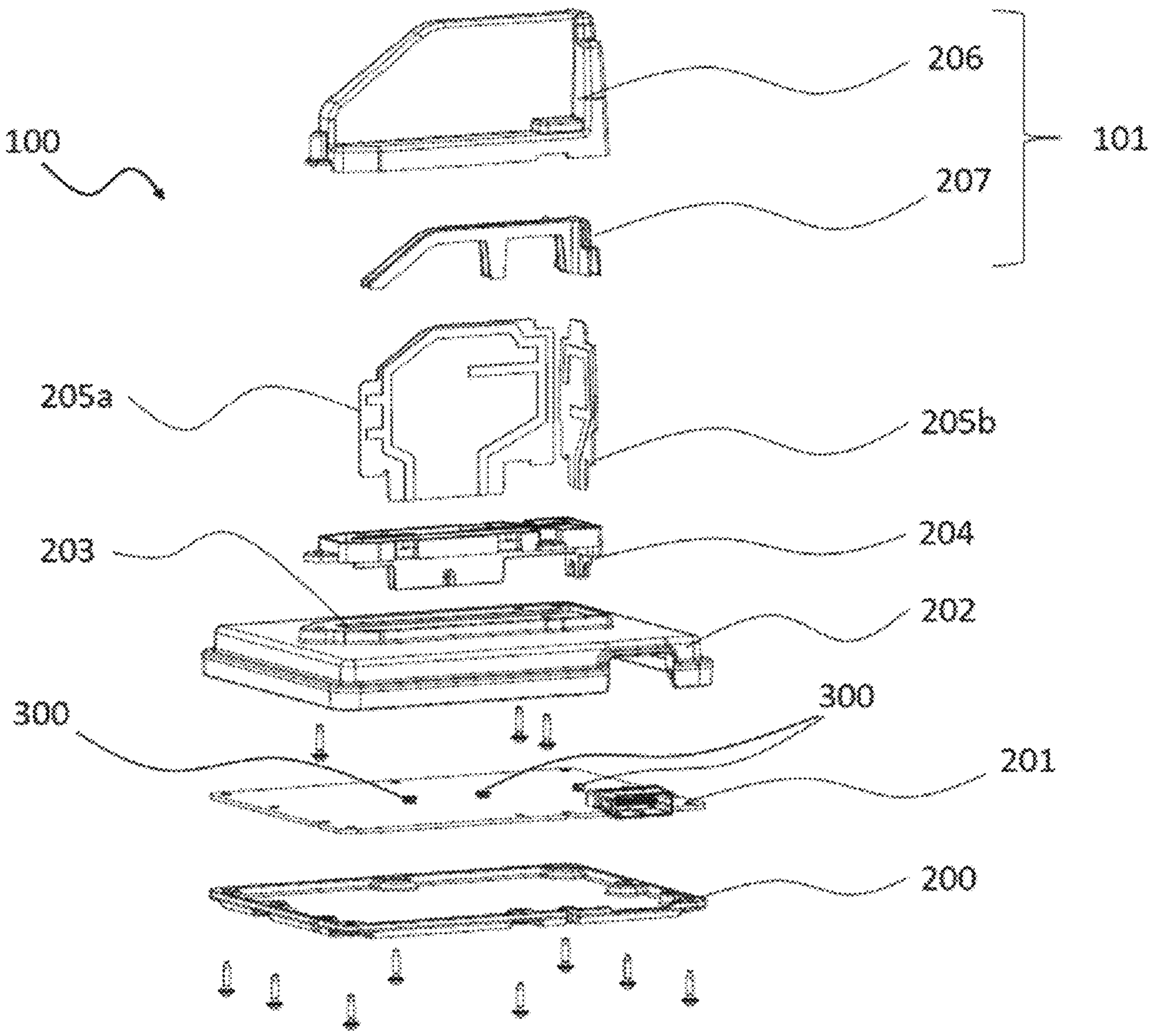
FIG. 2 is an exploded view of an antenna module according to a specific embodiment.

FIG. 2 is an exploded view of the antenna module 100 according to a specific embodiment. The housing 102 is made up of a lower part 200 and an upper part 202 between which a main printed circuit board 201, referred to as the motherboard, is arranged horizontally. The lower part 200 and the upper part 202 of the housing are for example assembled using a set of screws. In a specific embodiment, the upper part 202 is made of metal in order to ground the module to the vehicle and to shield the join between the antennas and the main board.

The motherboard 201 may be a single board comprising for example power supply and baseband signal processing circuits and a radio frequency processing circuit. However, the motherboard may be made up of separate boards carrying different circuits, without thereby modifying an aspect of the invention.

The upper part 202 of the housing comprises a recess 203 through which one or more vertical PCB antennas 205*a*, 205*b* project. PCB antenna means printed circuit boards on which one or more tracks forming an antenna pattern are formed and/or printed circuit boards comprising one or more three-dimensional antennas, such as a wire extending over the board, a metal element, or even a chip antenna.

Although the figures illustrating a specific embodiment of the antenna module show two PCB antennas 205*a* and 205*b*, the number and position of these antennas may vary without thereby modifying the an aspect of invention. For example, the antenna module may comprise a single antenna 205*a*.

For the sake of clarity and conciseness, the present description describes the features of an aspect of the invention in relation to the antenna 205*a*, with the same inventive concepts applying analogously to the antenna 205*b* and/or to any other vertical PCB antennas included in the antenna module.

The antenna 205*a* is for example designed to enable the transmission and/or reception of radio frequency signals. It may be an antenna for receiving an analog or digital radio signal, a Wi-Fi signal, or even an antenna for establishing connections to a cellular access network, for example a 2G, 3G, 4G or 5G access network.

The PCB antenna 205*a* is arranged perpendicular to the motherboard 201. According to a specific embodiment, the antenna module comprises a guide element 204 for keeping the PCB antenna 205*a* in a vertical position perpendicular to the motherboard. In a specific embodiment, the guide element is formed by a specific formation of the upper part 202 of the housing.

FIG. 2 also shows a shark-fin-shaped cover 101 intended to cover the antenna 205*a*. The cover 101 comprises a shell 206 made of a non-metal material and fastened to the upper part 202 of the housing, for example using screws or clips, as well as an elastic element 207.

The elastic element 207 is intercalated between the upper inner part of the shell 206 and the upper part of the antenna 205*a* so that at least a part of the elastic element 207 is in contact with the upper inner part of the shell 206 and the upper edge of the PCB antenna 205*a*. The elastic element is preferably a thermoplastic elastomer (TPE) of low hardness, for example Shore A 50, with a low dielectric loss tangent, preferably less than 0.07 to 6 GHz. In a specific embodiment, the elastic element 207 is overmolded in the shell 206.

As shown, the upper part of the shell 206 and the upper edge of the antenna 205*a* have substantially identical profiles. Since the shell 206 is intended to project from the roof of a vehicle, the shark-fin shape thereof helps to limit aerodynamic disturbances. The shape of the antenna 205*a* is therefore adapted to optimally fill the inside of the shell 206 and to enable the elastic element 207 to be intercalated between the shell 206 and the antenna 205*a* while using a minimum amount of material.

Figure 3:
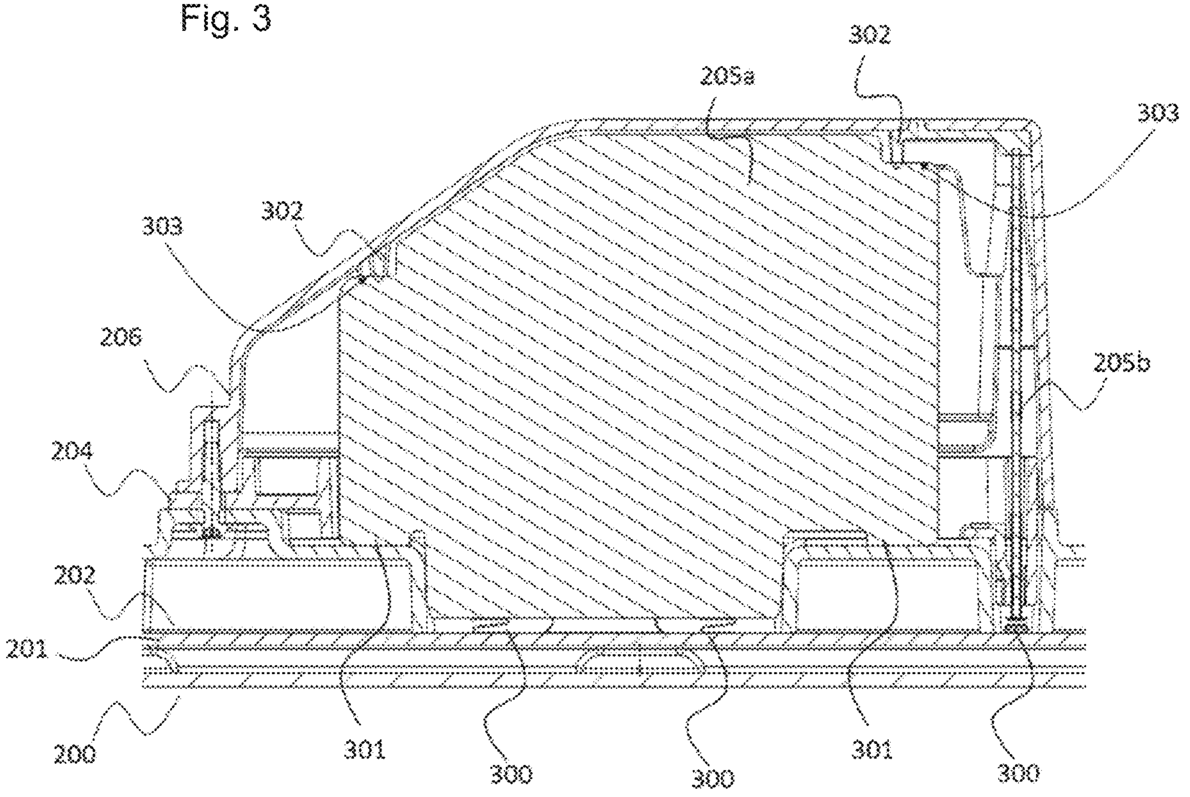
FIG. 3 is a cross-sectional view of an antenna module according to a specific embodiment, taken along the section line A-A shown in FIG. 1.

FIG. 3 is a longitudinal cross section of the assembled antenna module, taken along a section line A-A shown in FIG. 1. FIG. 3 shows flexible contacts 300 intended to electrically connect the antenna 205*a* to the motherboard 201. The flexible contacts 300 are in contact with a conductive part of the lower edge of the antenna 205*a* and are connected to a circuit of the motherboard. They thus provide electrical continuity between the antenna 205*a* and the motherboard, while enabling the antenna 205*a* to move relative to the motherboard 201. Such an assembly provides deformation, expansion and vibration tolerances without losing electrical continuity. According to a specific embodiment, the flexible contact points 300 are spring-loaded contact pins. According to a specific embodiment, the flexible contact points 300 are made of a conductive elastomer, for example a resilient silicone elastomer filled with copper particles.

Naturally, the number of flexible contacts depends on the number and/or type of antennas 205*a* fitted to the antenna module. The motherboard 201 may for example include a single flexible contact point 300.

The antenna 205*a* comprises at least one shoulder 301 that is designed to bear against a portion of the upper part 202 of the housing so as to ensure a minimum gap between the lower edge of the antenna 205*a* and the motherboard and to limit the compression of contact points 300.

FIG. 3 shows two interference pushers 302 formed by the elastic element 207 and designed to exert a pressure on the upper edge of the antenna 302 when the shell 206 is in place, thereby ensuring that the shoulders 301 are pressed against the housing and minimizing the compression of the flexible contact points 300. The width of a pusher is for example between 1.5 mm and 3 mm.

Interference pusher means a part of the elastic element 207 that is taller than the space available between the top of the inner part of the shell 206 and the upper edge of the antenna 205*a*, so that, when the cover is in place, the elastic element 207 is compressed between the shell 206 and the antenna 205*a* and exerts a vertical downward pressure on the upper edge of the antenna 205*a*.

According to a specific embodiment, the upper edge of the antenna 205*a* comprises at least one horizontal portion 303 on which a pusher 302 applies a pressure, so that the pressure is exerted vertically on the board.

Figure 4:
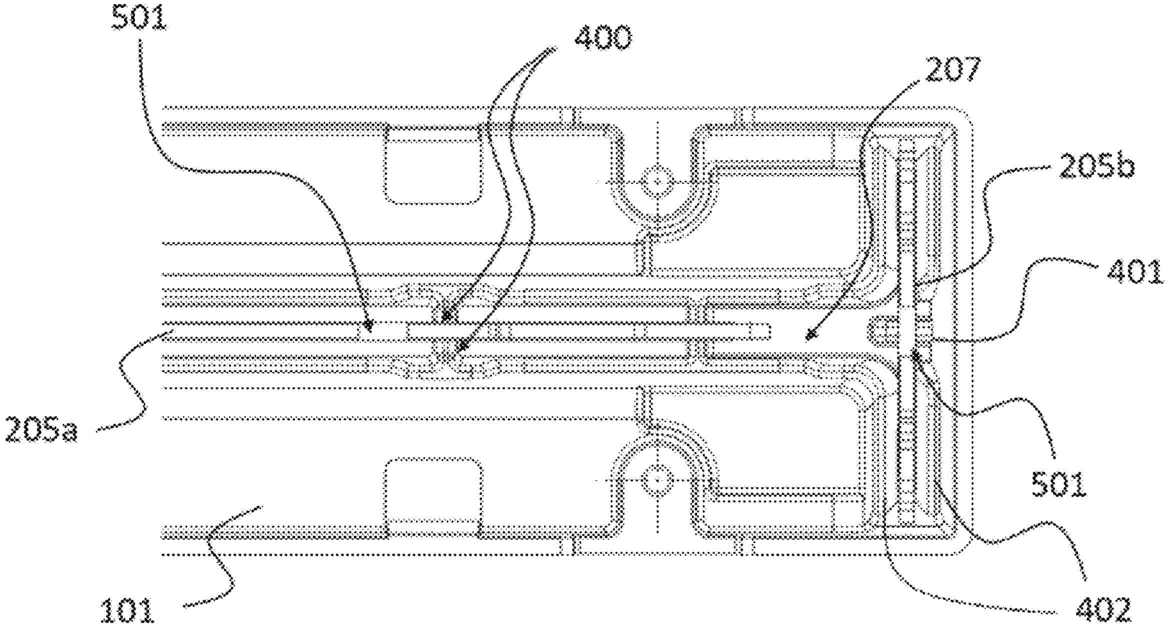
FIG. 4 is a bottom view of the inside of the cover comprising an elastic element and a PCB antenna, according to a specific embodiment.

FIG. 4 is an internal view of the cover 101 according to a specific embodiment, showing the elastic element 207 and the antenna 205*a*. FIG. 4 shows lateral holding elements, such as a pair of ribs 400, arranged to face one another and designed to receive the PCB antenna 205*a* and to limit the lateral movements thereof. Such ribs are for example 2 mm to 5 mm wide. Such an arrangement holds the upper part of the antenna 205*a* when the cover 101 is in position, and dampens the vibration liable to occur in the upper part of the antenna 205*a*. Furthermore, the upper part of the antenna 205*a* can be inserted, using a controlled mechanical force, between the ribs when positioning the cover 101, thereby limiting the stress caused to the boards.

Finally, FIG. 4 shows a conductive part 501 of the lower edge of the antenna 205*a* that is intended to make electrical contact with the flexible contacts 300 of the motherboard described above.

As specified above, a specific embodiment of the antenna module can comprise several PCB antennas. For example, FIGS. 2, 3 and 4 show a second vertical PCB antenna 205*b* that is arranged perpendicular to the motherboard, the plane of the antenna 205*b* being perpendicular to the plane of the antenna 205*a*. FIG. 4 shows a pusher 401 formed in the elastic element 207 and designed to exert a pressure on the upper edge of the antenna 205*b* in order to press it against a flexible contact element on the surface of the motherboard. Similarly to the description above relating to the antenna 205*a*, the antenna 205*b* comprises at least one shoulder, denoted 206 in FIG. 2, designed to bear against the upper part 202 of the housing and to limit the compression of a flexible contact, denoted 300 in FIG. 3, thereby ensuring electrical continuity between the antenna 205*b* and the motherboard 201. The lateral movements of the antenna 205*b* are limited by holding elements, denoted 402 in FIG. 4, such as ribs or tabs, formed by the flexible element 207.

The features described above provide a particularly reliable antenna module that is cheaper and easier to assemble compared to the prior art.

The invention claimed is:

1. A vehicle antenna module comprising:

a first main printed circuit board seated horizontally in a housing, at least one second printed circuit board comprising a radio frequency antenna mounted vertically on the first printed circuit board and projecting from an upper face of the housing, a cover mounted on said housing and designed to cover at least the second printed circuit board, wherein the cover comprises a shell and an elastic element, the elastic element being designed to exert a pressure on the upper edge of the second board when the cover is in place on the housing in order to provide an electrical contact between the lower edge of the second board and at least one flexible contact element on the surface of the first board.

2. The antenna module as claimed in claim 1, wherein the elastic element is designed to exert a pressure on the upper edge of the second board by at least one interference pusher.

3. The antenna module as claimed in claim 1, wherein the at least one flexible contact element is a spring-loaded pin.

4. The antenna module as claimed claim 1, wherein the at least one flexible contact element is made of a conductive elastomer.

5. The antenna module as claimed in claim 1, wherein the second board comprises at least one shoulder forming a stop bearing against the housing to limit the compression of the at least one flexible contact by the lower edge of the second board.

6. The antenna module as claimed in claim 1, wherein the elastic element is made by overmolding an internal part of the shell with a thermoplastic elastomer.

7. The antenna module as claimed in claim 1, wherein the elastic element comprises at least one pair of lateral ribs designed to receive the upper edge of the second board and to limit the lateral displacements thereof.

8. The antenna module as claimed in claim 1, wherein the elastic element has a Shore A hardness of between 45 and 55.

9. A vehicle comprising an antenna module as claimed in claim 1.

10. The antenna module as claimed in claim 2, wherein the at least one flexible contact element is a spring-loaded pin.

11. The antenna module as claimed claim 2, wherein the at least one flexible contact element is made of a conductive elastomer.

* * * * *